(12) United States Patent
Cochran et al.

(10) Patent No.: US 7,703,848 B1
(45) Date of Patent: Apr. 27, 2010

(54) VEHICLE SOUND AND VIBRATION SIMULATOR FOR USE WITH AN INFANT VEHICLE SEAT

(76) Inventors: David B. Cochran, 15414 279th Pl. NE., Duvall, WA (US) 98109; Bryce R. Hein, 19003 SE. 46 Way, Issaquah, WA (US) 98027; Michael Kung, 17007 NE. 136th Pl., Redmond, WA (US) 98052; Susannah A. Scholl, 6517 Greenwood Ave. N., Seattle, WA (US) 98103; Gregory A. Tacchetti, 25821 NE. 2nd Ct., Sammamish, WA (US) 98074

( * ) Notice: Subject to any disclaimer, the term of this patent is extended or adjusted under 35 U.S.C. 154(b) by 0 days.

(21) Appl. No.: 11/581,847

(22) Filed: Oct. 16, 2006

(51) Int. Cl.
A47D 15/00 (2006.01)
A61M 21/00 (2006.01)

(52) U.S. Cl. .................. 297/256.16; 297/217.4

(58) Field of Classification Search ............. 297/250.1, 297/256.16, 271.1, 271.3, 271.4; 600/28
See application file for complete search history.

(56) References Cited

U.S. PATENT DOCUMENTS

| | | | |
|---|---|---|---|
| 3,758,156 A | | 9/1973 | Zawadzki |
| 4,141,095 A | * | 2/1979 | Adachi ........................ 5/108 |
| 4,165,059 A | | 8/1979 | Summer |
| 4,507,816 A | * | 4/1985 | Smith, Jr. ........................ 5/666 |
| 4,620,334 A | | 11/1986 | Robinson |
| 4,656,680 A | * | 4/1987 | Wilson ........................ 5/108 |
| 4,785,797 A | * | 11/1988 | Cuervo ........................ 601/60 |
| D305,584 S | | 1/1990 | Spilman et al. |
| 4,979,777 A | * | 12/1990 | Takada ........................ 297/250.1 |
| 5,314,403 A | * | 5/1994 | Shaw ........................ 601/148 |
| 5,464,381 A | | 11/1995 | Wilson |
| 5,588,164 A | | 12/1996 | Proulx |
| 5,660,597 A | | 8/1997 | Fox et al. |
| 5,711,045 A | | 1/1998 | Caster et al. |
| 5,816,910 A | | 10/1998 | Steele et al. |
| 6,024,407 A | * | 2/2000 | Eakin ........................ 297/217.4 |
| 6,059,667 A | | 5/2000 | Pinch |
| 6,224,380 B1 | | 5/2001 | Lo et al. |
| 6,378,940 B1 | * | 4/2002 | Longoria et al. ......... 297/217.3 |
| 6,437,759 B1 | | 8/2002 | Turner et al. |
| 6,519,792 B2 | | 2/2003 | Chen |
| 7,036,880 B1 | | 5/2006 | Goodman |
| 7,039,207 B1 | * | 5/2006 | Elrod et al. ................. 381/301 |
| 2002/0100116 A1 | * | 8/2002 | Richards ........................ 5/108 |
| 2007/0129596 A1 | * | 6/2007 | Dickie ........................ 600/26 |

* cited by examiner

*Primary Examiner*—Joseph F Edell
(74) *Attorney, Agent, or Firm*—Davis Wright Tremaine LLP; Michael J. Donohue; Heather M. Colburn

(57) ABSTRACT

The invention includes a vehicle simulator for simulating the sounds and vibrations generated by a moving vehicle. The vehicle simulator includes a housing configured to receive any standard infant carrier including infant vehicle seats. An acoustic system, including an acoustic output transducer and a control unit, is coupled to the housing. The control unit provides a drive signal to the acoustic transducer, which the acoustic output transducer converts into sound waves that provide both vehicle movement sounds and vehicle movement vibrations. When an infant carrier in which an infant is seated is received within the housing, the vehicle movement sounds and vibrations are transmitted by the acoustic output transducer to the infant carrier where the sounds and vibrations create a soothing environment of sound and vibration designed to mimic the environment inside a moving vehicle.

15 Claims, 4 Drawing Sheets

VEHICLE SOUND AND VIBRATION SIMULATOR FOR USE WITH AN INFANT VEHICLE SEAT

BACKGROUND OF THE INVENTION

1. Field of the Invention

The invention relates generally to devices for soothing, comforting, calming, pacifying, and/or quieting a crying, upset, or otherwise fussing infant and more particularly, to devices that simulate the sound and vibration of a moving vehicle for the purposes of soothing, comforting, calming, pacifying, and/or quieting an infant.

2. Description of the Related Art

New parents discovered long ago that soothing a crying, upset, or otherwise fussing infant can be a difficult problem. A common and effective solution is to secure the infant in its infant vehicle seat and take the infant for a ride in a vehicle. The security of the infant vehicle seat, together with the vibration and sounds of the engine and road, soothe, comfort, calm, pacify, and/or quiet the infant. In some cases, the infant is lulled to sleep quickly and effectively.

Many modern infant vehicle seats include two components: a base and a seat. The base and seat are completely separable allowing the seat to be detached from the base and carried with the infant seated therein while the base portion remains installed within the vehicle. Many owners of infant vehicle seats install the base portion into their vehicle and rarely remove the base choosing instead to detach the carrier portion. Generally, the seat or carrier portion of the infant vehicle seat will include a handle to facilitate carrying. Alternatively, some infant vehicle seats are designed to be completely removed from the vehicle and serve as an infant carrier. Therefore, for many infants, their infant vehicle seat is also their infant carrier. These infants may be very familiar with and comfortable in their infant vehicle seats.

Devices for soothing and/or pacifying infants currently available in the marketplace include baby swings, rocking bassinets, and vibrating bouncer seats. All of these prior art devices include an attached or integrated infant seat. This feature has several drawbacks. In particular, the infant must be placed in an unfamiliar seat and, in some cases, removed from the seat he/she currently occupies. In many cases, that seat is the infant carrier portion of his/her infant vehicle seat. Further, manufacturing costs of the prior art devices are increased by the fabrication costs associated with the attached or integrated seat.

Many of the prior art devices employ a small speaker for producing sound and a separate mechanical shaker device to produce vibration. The moving mechanical components are subjected to operational wear and tear and consequently may require replacement as a result of repeated use.

Therefore a need exists for methods and devices for soothing an infant that utilize the carrier portion of the infant's infant vehicle seat instead of incorporating a new and unfamiliar infant seat. A need also exists for methods and devices that provide the soothing benefits of a ride in a moving vehicle without requiring a caregiver to leave the comfort and safety of home. A further need exists for methods and devices that provide a more realistic simulation of the interior environment of a moving vehicle. A need also exists for more convenient, safer, and less costly devices and methods for soothing, comforting, calming, pacifying, and/or quieting a crying, upset, or otherwise fussing infant.

BRIEF DESCRIPTION OF THE DRAWINGS

The novel features believed to be characteristic of this invention are set forth with particularity in the appended claims. The invention itself, however, both as to its organization and method of operation may best be understood by reference to the following description taken in connection with the accompanying drawings in which:

DETAILED DESCRIPTION OF THE INVENTION

The present invention will now be described more fully hereinafter with reference to the accompanying drawings, in which an embodiment of the invention is shown. The invention may, however, be embodied in many different forms and should not be construed as limited to the embodiment set forth herein. Rather, this embodiment is provided so that this application will be thorough and complete, and will fully convey the true scope of the invention to those skilled in the art. Like reference numbers refer to like elements throughout the figures.

For the purposes of this application, the words "infant vehicle seat" will be used to refer to any seat into which an infant is placed for the purposes of transporting the infant in a vehicle such as a car, van, truck, or the like. The words "infant carrier" refer to any infant carrier including an infant vehicle seat, a detachable infant carrier portion of a two or more part infant vehicle seat, and the like. An exemplary infant carrier 60 may be viewed in FIG. 3. The infant carrier 60 is provided for illustrative purposes only. It is understood by those of ordinary skill in the art that infant carriers are manufactured in various configurations, shapes, and sizes, and adaptation of the present invention for use with such configurations is within the scope of the present invention.

Figure 3:
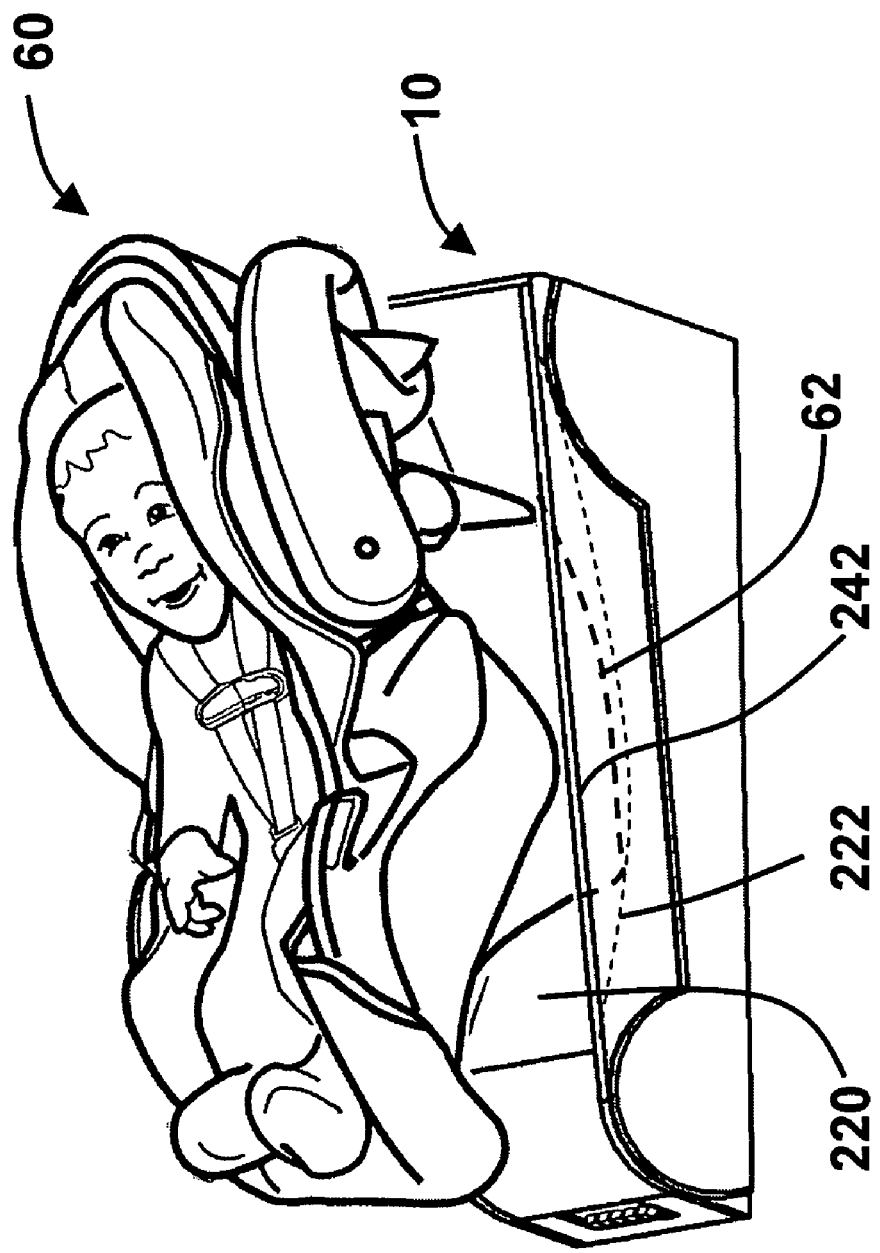
FIG. 3 is a perspective view of the vehicle sound and vibration simulator of FIG. 1 with an exemplary infant carrier received therein.

The invention is a vehicle sound and vibration simulator 10 for use with the infant carrier 60 (see FIG. 3). The invention is designed to receive any infant carrier and simulate the sounds and vibrations generated by a moving vehicle for the purposes of providing a soothing, comforting, claming, pacifying, and/ or quieting environment for the infant. While the infant is soothed, the infant's caregiver(s) need not operate a moving vehicle or leave the comfort of their home.

Figure 1:
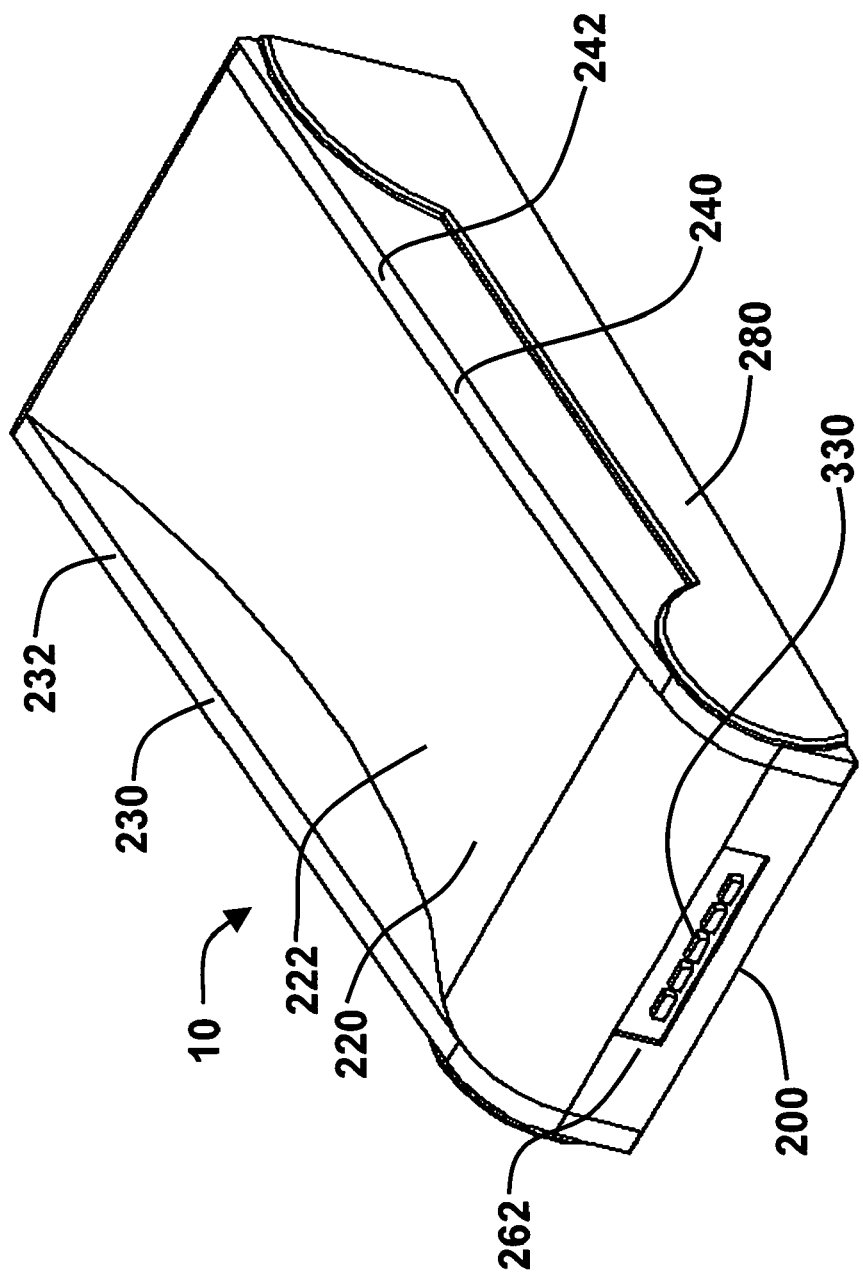
FIG. 1 is a perspective view depicting an embodiment of the vehicle sound and vibration simulator constructed in accordance with the present invention.
Figure 2:
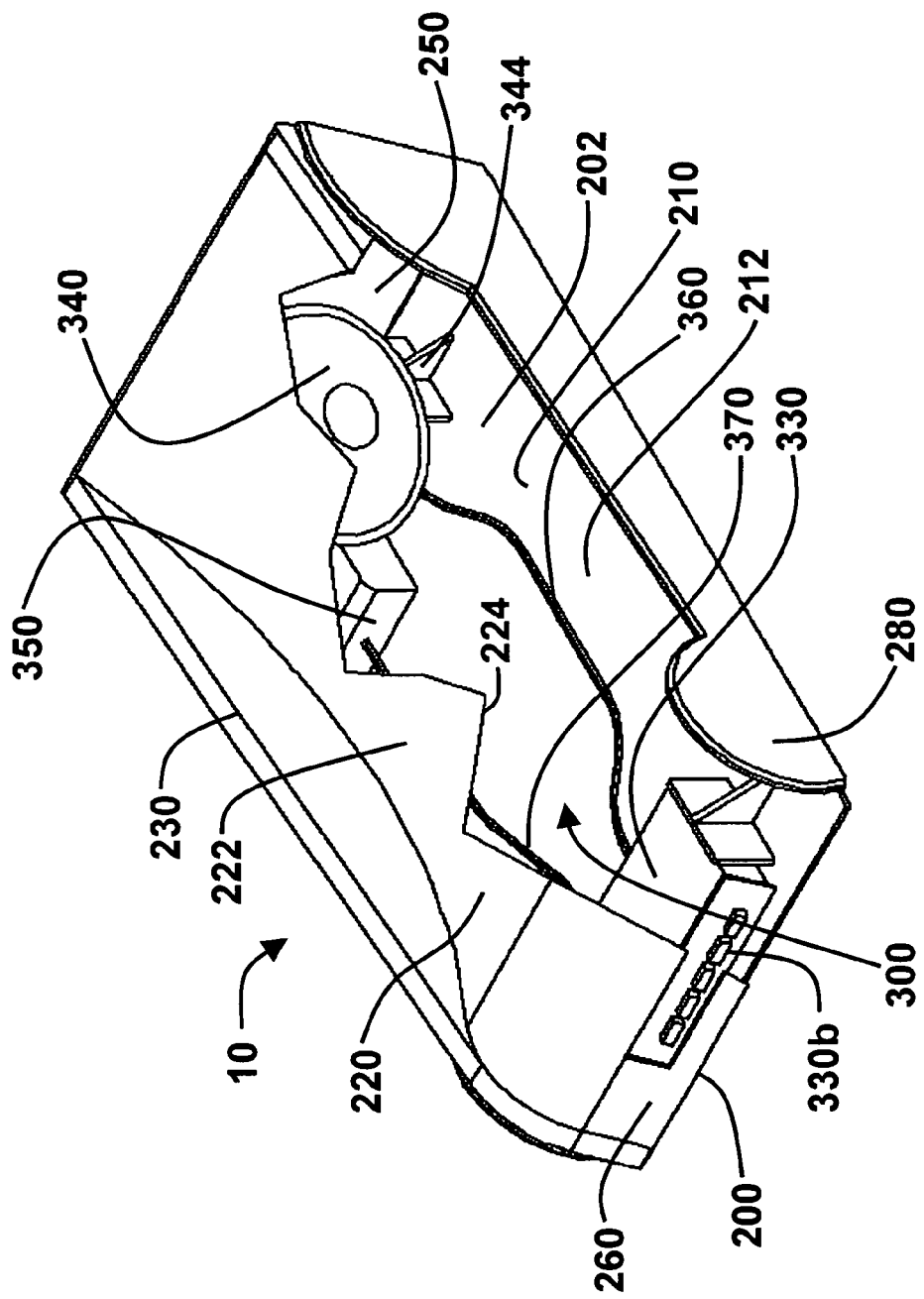
FIG. 2 is a perspective cutaway view showing a representative internal arrangement of components within the vehicle sound and vibration simulator of FIG. 1.

Referring to FIGS. 1-2, the vehicle sound and vibration simulator 10 for use with the infant carrier 60 includes a housing 200. The housing 200 may include a low profile that renders it close to the ground for safety purposes. In the embodiment depicted in the figures, the housing 200 includes a generally hollow interior portion 202 (best viewed in FIG. 2) allowing for the placement of electrical and other internal device components therein. The housing 200 may include a bottom platform 210 with an inside surface 212 that is enclosed by vertical sidewalls 230 and 240, a back panel 250, a front panel 260, and an upper platform 220 with an upper surface 222. The upper surface 222 may be contoured or otherwise configured to receive a bottom portion 62 (see FIG. 3) of the infant carrier 60. In the embodiment depicted in FIGS. 1-3, a portion of the upper surface 222 is generally concave to receive a generally convex portion of the bottom surface 62 of the infant carrier 60.

The front panel 260 of the housing 200 may includes an aperture 262 behind which a control unit 330 may be mounted. The aperture 262 may also provide access to the control unit 330 that may be located inside the hollow portion 202 of the housing 200 behind the aperture 262.

The vertical sidewalls 230 and 240 may extend upwardly beyond the upper surface 222. In this manner, the vertical sidewalls 230 and 240 may flank the upper surface 222 to create a pair of rails 232 and 242 along opposing sides of the upper surface 222. The rails 232 and 242 may act in concert to universally receive and secure the infant carrier 60 therebetween. The rails 232 and 242 may also act as integrated carrying handles for easy transportation of the device.

FIG. 2 depicts the internal arrangement of an acoustic system 300 inside the hollow portion 202 of housing 200. The acoustic system 300 includes the control unit 330. The control unit 330 provides a drive signal, such as an amplified audio signal, to an acoustic driver or acoustic output transducer 340 such as a loudspeaker, piezoelectric device, or the like that generates both sound and vibration. One non-limiting example of a suitable acoustic output transducer 340 includes a standard six inch by nine inch three-way automobile speaker.

The drive signal is converted by the acoustic output transducer 340 into acoustic waves. While the embodiment depicted in the figures includes only one acoustic output transducer 340, it is appreciated by those skilled in the art that the invention could include additional acoustic output transducers 340.

In one embodiment, acoustic output transducer 340 is mounted within the hollow portion 202 of the housing 200 by a support structure 344 including a bracket, fastener, spacer, or other fastening means. In the embodiment depicted in FIG. 2, the support structure 344 mounts the underside (not shown) of acoustic output transducer 340 to the inside surface 212 of the bottom platform 210. The support structure 344 may provide a mechanical path through which vibration is transmitted from the vibrating acoustic output transducer 340 to the structure of the housing 200. The support structure 344 may also position the acoustic output transducer 340 so that sounds and vibrations generated thereby are directed toward housing 200 or a portion thereof including the bottom surface 224 of the upper platform 220. Sound and vibration may be transferred from the vibrating acoustic output transducer 340 through the upper platform 220 and to the underside 62 of an infant carrier 60 disposed upon the upper platform 220. Further, the hollow portion 202 of the housing 200 may amplify the sound and vibration generated by the acoustic output transducer 340.

In an alternate embodiment, the acoustic output transducer 340 may be placed immediately adjacent to a portion of the housing 200. For example, the acoustic output transducer 340 may be mounted to the bottom surface 224 of the upper platform 220 facing into the bottom surface 224 of the upper platform 220. The acoustic output transducer 340 may be mounted to the housing 200 by any method known in the art including fastening the acoustic output transducer 340 to the housing 200 with screws, bolts, nails, glue, and the like. It may be desirable to place a seal between the acoustic output transducer 340 and the housing 200 to define a sealed air chamber (not shown) between the acoustic output transducer 340 and the housing 200.

In one embodiment, the acoustic system 300 may include a power supply 350 that renders the vehicle sound and vibration simulator 10 self-contained, which may provide portability, safety, or convenience. One embodiment of a suitable power supply 350 includes an array of standard alkaline batteries housed within a battery compartment. Alternatively, the acoustic system 300 may include a standard AC power cord configured to be received within a standard household electrical outlet, an ac/dc adaptor, and/or other standard electrical components well known in the art for powering acoustic systems such as the acoustic system 300.

Wire harnesses 360 and 370 may transport power and electronic signals between the various components of the acoustic system 300. For example, wire harness 360 may provide power from the control unit 330 to the acoustic output transducer 340. Alternatively, a wire harness (not shown) may be provided that supplies power directly from the power supply 350 to the acoustic output transducer 340. Wire harness 360 may form an electrical path over which the drive signal from the control unit 330 is transferred to the acoustic output transducer 340. Wire harness 370 may provide power from the power supply 350 to the control unit 330.

The housing 200 may be constructed from any suitably rigid material capable of supporting the infant carrier with the infant seated therein and susceptible to vibration generated by an acoustic output transducer 340. Exemplary materials suitable for constructing the housing 200 include injection-molded plastic, wood, vacuum formed plastic, molded composites, and the like. Optionally, decorative elements 280 such as decals and the like can be applied to the outer surfaces of the housing 200.

FIG. 3 illustrates an infant carrier 60 received within one embodiment of the vehicle sound and vibration simulator 10 of the present invention. The infant carrier 60 is disposed upon and cradled by the upper surface 222 of the upper platform 220. The infant carrier 60 may also be nested between the rails 232 (not visible in this view) and 242.

Figure 4:
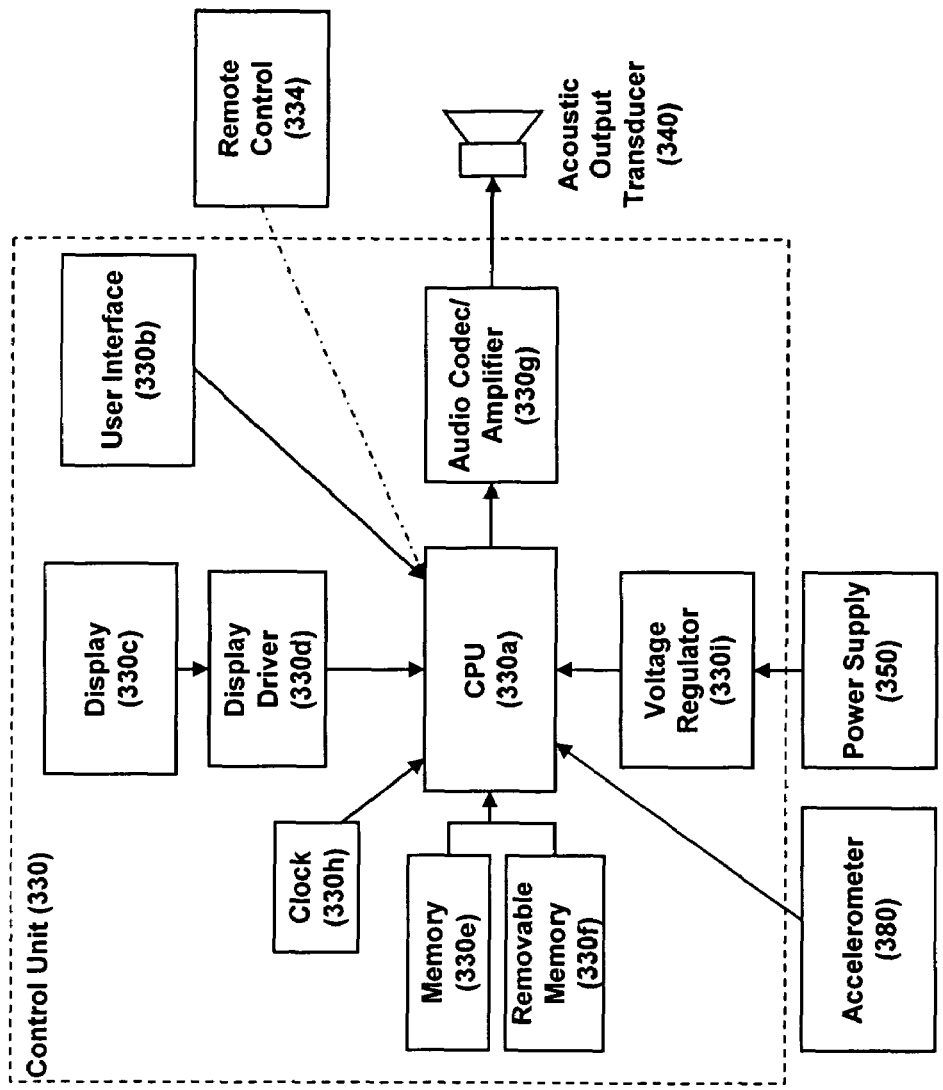
FIG. 4 is a block diagram illustrating the functional relationship of the components of an exemplary embodiment of an acoustic system constructed for use with the vehicle sound and vibration simulator of FIG. 1.

FIG. 4 is a block diagram of the components of the exemplary acoustic system 300. In one embodiment, blocks 330a through 330i are subcomponents of the control unit 330 and may reside within a common physical housing. The control unit 330 includes a programmable central processing unit (CPU) 330a which may be implemented by any known technology, such as a microprocessor, microcontroller, application-specific integrated circuit (ASIC), digital signal processor (DSP), or the like. A suitable CPU for use with the vehicle sound and vibration simulator 10 includes the MAX5406 audio processor manufactured by Maxim Integrated Products, Inc., with a business address of 120 San Gabriel Dr., Sunnyvale, Calif. 94086.

The CPU 330a may be integrated into an electrical circuit, such as a conventional circuit board, that supplies power to the CPU 330a. Additional electrical components such as a clock, audio codec, audio amplifier, antenna, optical sensor, accelerometer, memory, equalizer, volume control, etc. may be connected to the circuit board allowing electrical communication between the CPU 330a and the additional electrical components. However, as will be appreciated by those of ordinary skill in the art, much of the functionality of the additional electrical components could be incorporated into and performed by the CPU 330a and such embodiments are within the scope of the present invention.

The CPU 330a may include internal memory 330e or memory may be coupled thereto. The memory 330e may comprise random access memory (RAM) and read-only memory (ROM). The memory 330e contains instructions and data that control the operation of the CPU 330a. The memory 330e may also include a basic input/output system (BIOS), which contains the basic routines that help transfer information between elements within the control unit 330. The present invention is not limited by the specific hardware component(s) used to implement the CPU 330a or memory 330e components of the control unit 330.

Optionally, the control unit 330 may include external or removable memory devices 330f such as floppy disk drives and optical storage devices (e.g., CD-ROM, R/W CD-ROM, DVD, and the like). The control unit 330 may also include one or more I/O interfaces such as a serial interface (e.g., RS-232, RS-432, and the like), an IEEE-488 interface, a universal serial bus (USB) interface, a parallel interface, and the like, for the communication with removable memory devices 330f such as flash memory drives, external floppy disk drives, and the like.

The control unit 330 may include a user interface 330b to permit the user to choose various modes of operation and various sounds. For example, the user could select the particular drive signal, volume of the drive signal, duration of the drive signal, and the like. As one non-limiting example of possible user selection choices, the user interface includes a set of buttons. Each button may correspond to a particular vehicle sound. For example, one button may correspond to a compact car, another to a luxury car, a third to a truck, and so on. Another set of buttons or dials may correspond to volume and/or duration settings. For example, a set of three buttons may correspond to low, medium, and high volume settings. Similarly, a separate set of three buttons may determine a short, medium, or long simulation duration. While the user interface 330b depicted in FIGS. 1-3 includes an externally exposed control panel with a plurality of selection buttons, it is appreciated by those of ordinary skill in the art that alternate user interfaces such as knobs, dials, and the like, are within the scope of the present invention. In addition, a remote control 334 may be used in conjunction with or in place of the controls of the user interface 330b. Some devices, such as the MAX5406 audio processor, include integrated remote control functionality.

The control unit 330 may also include a display 330c such as an LCD, selection buttons, lights above the selection buttons, or other visual display. The display 330c may indicate to the user any user selections made via the user interface 330b. The display 330c may also indicate the remaining duration of the simulation and/or other useful information. In some embodiments, a display driver 330d may provide an interface between the CPU 330a and the display 330c.

The control unit 330 may also include an antenna or other signal receiving device such as an optical sensor for receiving a command signal such as a radio frequency (RF) or optical signal from the remote control 334. The control unit 330 may also include software components for interpreting the command signal and executing commands included in the command signal.

The various components of the control unit 330 may be coupled together by an internal bus system. The internal bus system may comprise a data bus, control bus, power bus, I/O bus, and the like.

During operation of the vehicle sound and vibration simulator 10, the CPU 330a executes commands directing the recall of an audio file storing a drive signal from memory 330e-330f. The audio file may store a recorded or synthesized audio signal. In embodiments that include the user interface 330b that allows a user to select the drive signal, selection of the audio file may be made by the user through the user interface. The user's selection may be confirmed through the display 330c before the audio file is recalled. After the user makes a selection, playback of the appropriate audio file may begin. Alternatively, which audio file is played may be predetermined and included in the software instructions directing audio file recall.

In some embodiments, the audio file is a recorded audio signal that is played back by the acoustic system 300. In these embodiments, the audio signal may include a recording of the sounds generated by an actual vehicle, such as a Corvette. These sounds may be recorded by a microphone placed in or the near the vehicle while its engine is running. For example, engine sounds may be recorded by placing a microphone in the exhaust pipe of a vehicle. The recorded sounds may be modified to remove or attenuate some frequencies and boost others. In alternate embodiments, the audio file may include the parameters and other information necessary to construct a synthetic audio signal. The audio file may be stored in the internal or on-board memory 330e of the control unit 330 or on the removable memory device 330f.

It may be desirable to modify the drive signal to provide a predetermined amount of vibration to the infant. For example, the amount of vibration generated may be increased if the lower frequency components of the drive signal are amplified. Further, it may be desirable to limit the volume of the sounds generated or the amount of vibration experienced by an infant. It may also be desirable to attenuate or remove certain frequencies from the sounds generated by the acoustic output transducer 340 to avoid injury to the infant.

In some embodiments, the audio file must be decoded before the drive signal stored therein can be routed to the acoustic output transducer 340. Decoding may be performed by an audio codec/amplifier 330g or any hardware and/or software components known in the art for decoding audio files. The drive signal may also be amplified. Amplification may be performed by the audio codec/amplifier 330g or any hardware and/or software components known in the art for amplifying drive or audio signals To avoid startling or otherwise upsetting the infant, the volume or amplitude of the drive signal reproduced by the acoustic system 300 may be gradually increased over a predetermined period of time until a target volume is obtained. The predetermined period of time during which the volume is gradually increased may be about 5 to about 15 seconds, and preferably about 10 seconds.

After the target volume is reached, the acoustic system 300 continues to play the audio file for a predetermined time period. For example, the acoustic system 300 may continue to supply a drive signal to the audio output transducer 340 for about 10 to about 20 minutes. Depending on the length of the audio file, to play the file for the entire predetermined time period, a single file may need to be repeated or played continuously in a loop. At the end of the predetermined time period, the acoustic system 300 may gradually decrease the volume from the target volume and turn off the acoustic system 300. The duration during which the volume is gradually decreased may be about 10 to about 30 seconds, and preferably about 20 seconds. Timing events within the control unit 330 of the acoustic system 300 may use inputs from an internal clock 330h.

Optionally, an accelerometer 380 or equivalent device may be attached to the housing 200 for monitoring the vibration experienced by the housing 200. The amount of vibration caused by the acoustic waves generated by the acoustic system 300 may depend upon the weight and configuration of the infant carrier 60 and the weight of the infant seated therein.

Consequently, monitoring the amount of vibration actually experienced by the housing 200 may help when determining the appropriate signal to play as well as its volume and frequency components. The control unit 330 may receive displacement information from the accelerometer 380 and adjust the level of the drive signal appropriately. Alternatively, the output of the accelerometer 380 may be used to alter the spectral content of drive signal. In this manner, the signal may be tuned to provide a more soothing amount of vibration to the infant. In some cases, the signal may be tuned to maximize the vibration experienced by the infant without exceeding the target playback volume. The accelerometer 380 may be positioned anywhere on the housing 200 including on the upper platform 220 in order to achieve the desired measurement sensitivity. Other forms of control sensors known in the art may be used in place of the accelerometer 380. The vehicle sound and vibration simulator 10 is not limited by the form of the control sensor.

The frequency spectrum of the drive signal sent by the control unit 330 to the acoustic output transducer 340 may be divided into two sets of frequencies. The first set of frequencies simulates the ambient environmental sounds within a moving vehicle. The first set of frequencies may include frequencies within the range of approximately 75 Hz to approximately 14 KHz. The second set of frequencies provides the vibration that simulates the vibration inside a moving vehicle. The second set of frequencies may include frequencies within the range of approximately 28 Hz to approximately 75 Hz.

Each of the frequency sets may be tuned independently to most effectively soothe an infant. In embodiments that include more than one acoustic output transducer 340, it may be desirable to dedicate one or more acoustic output transducers 340 to the first set of frequencies or a portion thereof and one or more acoustic output transducers 340 to the second set of frequencies or a portion thereof. In this manner, each acoustic output transducer 340 can be selected based on a subset of all frequencies produced by the acoustic system 300. Alternatively, the three-way speaker described above includes multiple speaker elements intended to provide output capability over multiple overlapping frequency ranges.

As discussed above, the control unit 330 is powered by a power supply 350. Voltage delivered to the CPU 330a and the other components of the control unit 330 may be controlled by a voltage regulator 330i coupled to the power supply 350.

An embodiment of a method of soothing an infant in accordance with the present invention will now be described. First, the infant is secured within its infant carrier 60. Then, the infant carrier 60 is received by the upper surface 222 of the upper platform 220. The infant carrier 60 may be nested between rails 232 and 242. In embodiments including a user interface 330b, a caregiver may input information into the control unit 330. The information provided may include the selection of an audio file to play and the volume and/or duration of play. Next, the acoustic system 300 begins to play the audio file. Playing the audio file includes providing a drive signal derived from the audio file to the acoustic output transducer 340. The acoustic output transducer 340 converts the drive signal into sound waves, which vibrate the housing 200 and infant carrier 60 disposed thereupon. The amount of vibration may be monitored and adjusted to provide a predetermined level of vibration. It may be desirable to vibrate the housing 200 and infant carrier 60 assembly at or near its resonance frequency to maximize the amount of vibration delivered to the infant carrier. The vibration and sounds generated by the sound and vibration simulator 10 soothe, comfort, calm, pacify, and/or quiet the infant. After a predetermined duration of play, the acoustic system 300 may discontinue playing the audio file. The infant carrier 60 may then be removed from the vehicle sound and vibration simulator 10.

In embodiments using audio files that store natural or recorded vehicle sound and vibration, the simulation supplied by vehicle sound and vibration simulator 10 may be more realistic and effective than systems currently available. The present invention provides a safe alternative to a late night drive piloted by a tired caregiver. In an age of increasing gasoline prices, the present invention is also a cost-effective way to soothe an infant. Because the present invention is designed to receive any standard infant carrier 60, a caregiver can move the infant between the vehicle and their home without disrupting or otherwise upsetting the infant secured within the infant carrier.

The vehicle sound and vibration simulator 10 is a stylish and practical solution to comforting, soothing, calming, pacifying, and/or quieting a crying, upset, or otherwise fussing infant an infant that can be used virtually anywhere because of its portability. The vehicle sound and vibration simulator 10 is a product that is appealing to parents, grandparents, day care centers, and can be given as a baby shower gift to an expectant parent.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An infant carrier base for use with an infant carrier having a lower portion, the base comprising:
a substantially rigid housing defining a hollow interior region and having a substantially rigid upper platform with an upper surface configured to removably receive and support the lower portion of the infant carrier;
a loudspeaker coupled to the housing inside the hollow interior region and configured to convert a drive signal into sound waves that provide both vehicle movement sounds and vehicle movement vibrations configured to vibrate the substantially rigid housing to thereby simulate vibrations generated by a moving vehicle, the drive signal comprising frequencies from about 28 Hz to about 75 Hz; and
a control unit coupled to the housing and configured to generate the drive signal, wherein the control unit is operably connected to the loudspeaker to transmit the drive signal to the loudspeaker.

2. The base of claim 1 wherein the drive signal has an associated drive signal level, the base further comprising an accelerometer coupled to the housing wherein the accelerometer is configured to measure a vibration level and the accelerometer is coupled to the control unit to control the drive signal level based on the vibration level.

3. The base of claim 1, wherein the control unit comprises a memory configured to store a plurality of audio files each convertible by the control unit into the drive signal and the drive signal is selected from the plurality of audio files.

4. The base of claim 3, wherein the control unit comprises a user interface operable by a user to select one of the plurality of audio files.

5. The base of claim 1, wherein the drive signal comprises a duration and the control unit comprises a user interface operable by a user to select the duration of the drive signal.

6. The base of claim 5, wherein the control unit comprises a memory configured to store a plurality of predetermined drive signal durations and the duration of the drive signal is selected from the plurality of predetermined drive signal durations.

7. The base of claim 1, wherein the drive signal comprises a drive signal level and the control unit comprises a user interface operable by a user to select the drive signal level.

8. The base of claim 7, wherein the control unit comprises a memory configured to store a plurality of predetermined drive signal levels and the drive signal level is selected from the plurality of predetermined drive signal levels.

9. The base of claim 1, comprising a remote control configured to send a wireless command signal wherein the control unit is configured to receive and execute the wireless command signal.

10. The base of claim 1, wherein the loudspeaker is coupled to the housing inside the hollow interior region below the substantially rigid upper platform and positioned to direct the sound waves toward the substantially rigid upper platform, the substantially rigid upper platform transferring vehicle movement vibrations provided by the sound waves to the lower portion of the infant carrier.

11. The base of claim 10, wherein the substantially rigid upper platform has a lower surface opposite its upper surface, the lower surface facing the hollow interior region defined by the housing, and the loudspeaker is adjacent the lower surface.

12. The base of claim 1, wherein the sound waves are amplified by the hollow interior region defined by the housing.

13. The base of claim 1 for use with an infant carrier having a lower portion selectively couplable to and detachable from a base portion installable in a vehicle, wherein the upper surface of the substantially rigid upper platform comprises a concave portion configured to removably receive the lower portion of the infant carrier when the lower portion of the infant carrier is detached from the base portion.

14. An infant carrier base for use with an infant carrier, the base comprising:
a self-supporting rigid hollow outer shell having a rigid infant carrier support portion configured to removably receive and support the infant carrier
a loudspeaker coupled inside the self-supporting hollow outer shell and configured to generate sound waves in response to a drive signal that vibrate the self-supporting hollow outer shell to simulate vibrations generated by a moving vehicle, the drive signal comprising frequencies from about 28 Hz to about 75 Hz, when vibrating, the self-supporting hollow outer shell vibrating the infant carrier supported thereby; and
a control unit coupled to the loudspeaker and configured to transmit the drive signal thereto.

15. The base of claim 14 for use with an infant carrier having a convex lower portion, wherein the rigid infant carrier support portion of the self-supporting rigid hollow outer shell has a contoured portion configured to receive and support the convex lower portion of the infant carrier.

* * * * *